US012743174B2

(12) United States Patent
Nam

(10) Patent No.: US 12,743,174 B2
(45) Date of Patent: Sep. 22, 2026

(54) IMAGE DISPLAY DEVICE AND OPERATING METHOD THEREFOR

(71) Applicant: LG ELECTRONICS INC., Seoul (KR)

(72) Inventor: Sungyun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 18/865,178

(22) PCT Filed: Mar. 24, 2023

(86) PCT No.: PCT/KR2023/003927
§ 371 (c)(1),
(2) Date: Nov. 12, 2024

(87) PCT Pub. No.: WO2023/219259
PCT Pub. Date: Nov. 16, 2023

(65) Prior Publication Data

US 2026/0195010 A1 Jul. 9, 2026

(30) Foreign Application Priority Data

May 12, 2022 (KR) ........................ 10-2022-0058275

(51) Int. Cl.
*G06F 3/041* (2006.01)
*G09G 3/20* (2006.01)
*G09G 3/34* (2006.01)

(52) U.S. Cl.
CPC ...... *G06F 3/04184* (2019.05); *G06F 3/04164* (2019.05); *G09G 3/2096* (2013.01);
(Continued)

(58) Field of Classification Search
CPC ............ G06F 3/04164; G06F 3/04184; G09G 2320/064; G09G 3/2096; G09G 2354/00;
(Continued)

(56) References Cited

U.S. PATENT DOCUMENTS

2014/0210791 A1 7/2014 Hanauer et al.
2016/0277656 A1* 9/2016 Tsunoda ................ H04N 23/73
(Continued)

FOREIGN PATENT DOCUMENTS

JP 2014-71507 A 4/2014
JP 2014-217019 A 11/2014
(Continued)

*Primary Examiner* — Muhammad N Edun
(74) *Attorney, Agent, or Firm* — Birch, Stewart, Kolasch & Birch, LLP

(57) ABSTRACT

The present disclosure relates to an image display device and an operating method therefor. The image display device according to one embodiment of the present disclosure comprises: a display including a plurality of touch electrodes; and a control unit, wherein the display comprises: a backlight module including at least one light source; and a touch module for detecting a touch on the display on the basis of the capacitance of the plurality of touch electrodes, and the control unit outputs a control signal corresponding to the brightness of the light source, and the touch module can set a reference value for the capacitance on the basis of the control signal and detect the touch on the basis of whether the capacitance is greater than or equal to the reference value. Other various embodiments are possible.

14 Claims, 16 Drawing Sheets

(52) U.S. Cl.
CPC ....... *G09G 3/342* (2013.01); *G09G 2320/064* (2013.01); *G09G 2354/00* (2013.01); *G09G 2360/144* (2013.01); *G09G 2360/16* (2013.01)

(58) Field of Classification Search
CPC ......... G09G 2360/16; G09G 2360/144; G09G 3/342
See application file for complete search history.

(56) References Cited

U.S. PATENT DOCUMENTS

| | | | | |
|---|---|---|---|---|
| 2017/0097723 | A1* | 4/2017 | Ogawa | G02F 1/13338 |
| 2024/0073305 | A1* | 2/2024 | Yu | G06F 1/1643 |

FOREIGN PATENT DOCUMENTS

| | | | |
|---|---|---|---|
| JP | 6060034 | B2 | 1/2017 |
| KR | 10-2019-0056817 | A | 5/2019 |
| KR | 10-2019-0125604 | A | 11/2019 |

* cited by examiner

<1310>

<1320>

IMAGE DISPLAY DEVICE AND OPERATING METHOD THEREFOR

CROSS REFERENCE TO RELATED APPLICATIONS

This application is the National Phase of PCT International Application No. PCT/KR2023/003927, filed on Mar. 24, 2023, which claims priority under 35 U.S.C. 119(a) to Patent Application No. 10-2022-0058275, filed in the Republic of Korea on May 12, 2022, all of which are hereby expressly incorporated by reference into the present application.

TECHNICAL FIELD

The present disclosure relates to an image display device and a method for operating the image display device.

BACKGROUND ART

An image display device is a device designed to display an image that can be viewed by a user. Representative examples of the image display device include a liquid crystal display (LCD) device using a liquid crystal and an organic light emitting diode (OLED) display device using an OLED.

Among them, an LCD panel includes a TFT substrate and a color substrate that face each other with a liquid crystal layer interposed therebetween and can display an image using light provided from a backlight unit. Meanwhile, an OLED panel can display an image by depositing a self-luminescent organic layer on a substrate having a transparent electrode formed thereon.

Recently, image display devices have been implemented as a display equipped with a touch panel. In addition, a variety of research has been conducted to improve the accuracy of detecting a touch on a display and prevent touch-related malfunctions due to various causes.

DISCLOSURE

Technical Problem

It is an objective of the present disclosure to solve the above and other problems.

It is another objective of present disclosure to provide an image display device capable of setting a reference value associated with touch detection according to brightness of a light source, and a method for operating the image display device.

It is yet another objective of present disclosure to provide an image display device capable of setting a reference value associated with touch detection for each of a plurality of screen areas according to brightness of a plurality of light sources corresponding to the plurality of screen areas, and a method for operating the image display device.

Technical Solution

In accordance with an aspect of the present disclosure, there is provided an image display device including: a display including a plurality of touch electrodes; and a controller, wherein the display includes: a backlight module including at least one light source; and a touch module configured to detect a touch on the display based on a capacitance of the plurality of touch electrodes, the controller is configured to output a control signal corresponding to a brightness of the light source, and the touch module is configured to: set a reference value for the capacitance based on the control signal; and detect the touch based on whether the capacitance is greater than or equal to the reference value.

In accordance with another aspect of the present disclosure, there is provided a method for operating an image display device, the method including: determining, by a controller of the image display device, a brightness of a light source included in a backlight module of a display of the image display device; setting, by a touch module of the image display device, a reference value for a capacitance of a plurality of touch electrodes included in the display based on the determined brightness of the light source; and detecting, by the touch module, a touch on the display based on whether the capacitance is greater than or equal to the reference value.

Advantageous Effects

An image display device of the present disclosure has the following effects.

According to at least one of the embodiments of the present disclosure, by setting a reference value associated with touch detection according to the brightness of a light source, it is possible to improve the accuracy of touch detection.

According to at least one of the embodiments of the present disclosure, as a reference value associated with touch detection for each of a plurality of screen areas is set according to the brightness of a plurality of light sources corresponding to the plurality of screen areas, it is possible to further improve the accuracy of touch detection.

Further scope of applicability of the present disclosure will become apparent from the detailed description given hereinafter. It should be understood, however, that the detailed description and specific examples, such as the preferred embodiments of the present disclosure, are given by way of illustration only, since various changes and modifications within the spirit and scope of the present disclosure will be apparent to those skilled in the art.

MODE FOR THE INVENTION

Figure 1:
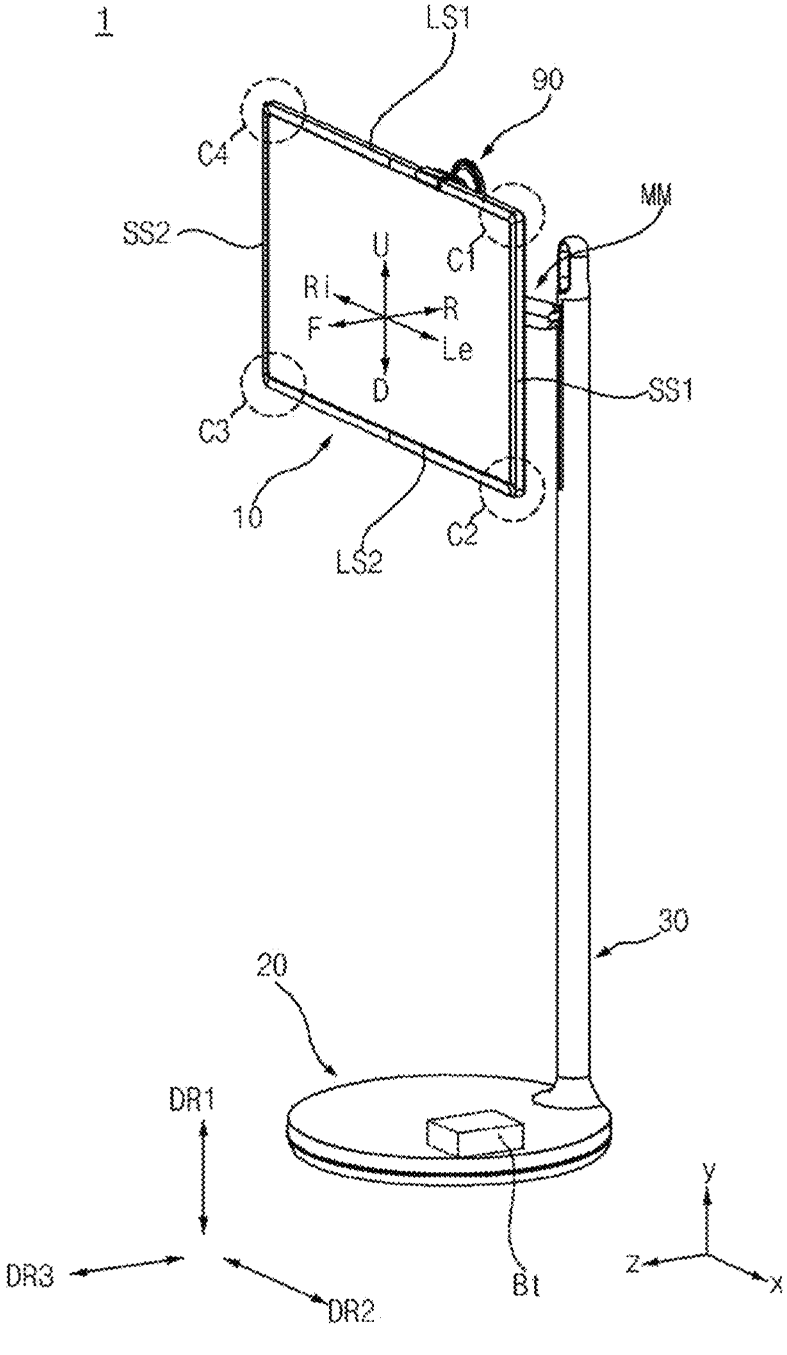
FIGS. 1 to 8 illustrate examples of an image display device according to embodiments of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

The suffixes "module" and "unit" used in the following description are given simply in view of the ease of the description, and do not carry any important meaning or role. Therefore, the "module" and the "unit" may be used interchangeably.

It will be understood that the terms "comprises or includes," "has," etc., when used in this specification, specify the presence of stated features, integers, steps, operations, elements, components, or combinations thereof, but do not preclude the presence or addition of one or more other features, integers, steps, operations, elements, components, or combinations thereof.

It will be further understood that although the terms "first," "second," etc. are used herein to describe various components, these components should not be limited by these terms. These terms are only used to distinguish one component from another component.

Referring to FIG. 1, an image display device 1 may include a head 10. The head 10 may display an image. The head 10 may be referred to as a display 10 or a display unit 10.

The head 10 may include a first long side LS1, a second long side LS2 opposite the first long side LS1, a first short side SS1 adjacent to the first long side LS1 and the second long side LS2, and a second short side SS2 opposite the first short side SS1. For ease of explanation, it is illustrated and described that lengths of the first and second long sides LS1 and LS2 are greater than lengths of the first and second short sides SS1 and SS2. However, the lengths of the first and second long sides LS1 and LS2 may be substantially equal to the lengths of the first and second short sides SS1 and SS2.

A direction parallel to the short sides SS1 and SS2 of the head 10 may be referred to as a first direction DR1 or an up-and-down direction. A direction parallel to the long sides LS1 and LS2 of the head 10 may be referred to as a second direction DR2 or a left-and-right direction. A direction perpendicular to the long sides LS1 and LS2 and the short sides SS1 and SS2 of the head 10 may be referred to as a third direction DR3 or a front-and-rear direction.

A direction in which the head 10 displays an image may be referred to as a front (F, z), and a direction opposite to the front may be referred to as a rear (R). The first short side SS1 may be referred to as a left side (Le, x). The second short side SS2 may be referred to as a right side (Ri). The first long side LS1 may be referred to as an upper side (U, y). The second long side LS2 may be referred to as a lower side (D).

The first long side LS1, the second long side LS2, the first short side SS1, and the second short side SS2 may be referred to as edges of the head 10. In addition, points where the first long side LS1, the second long LS2, the first short side SS1, and the second short side SS2 meet one another may be referred to as corners.

A point where the first short side SS1 and the first long side LS1 meet may be referred to as a first corner C1. A point where the first short side SS1 and the second long side LS2 meet may be referred to as a second corner C2. A point where the second short side SS2 and the second long side LS2 meet may be referred to as a third corner C3. A point where the second short side SS2 and the first long side LS1 meet may be referred to as a fourth corner C4.

Figure 2:
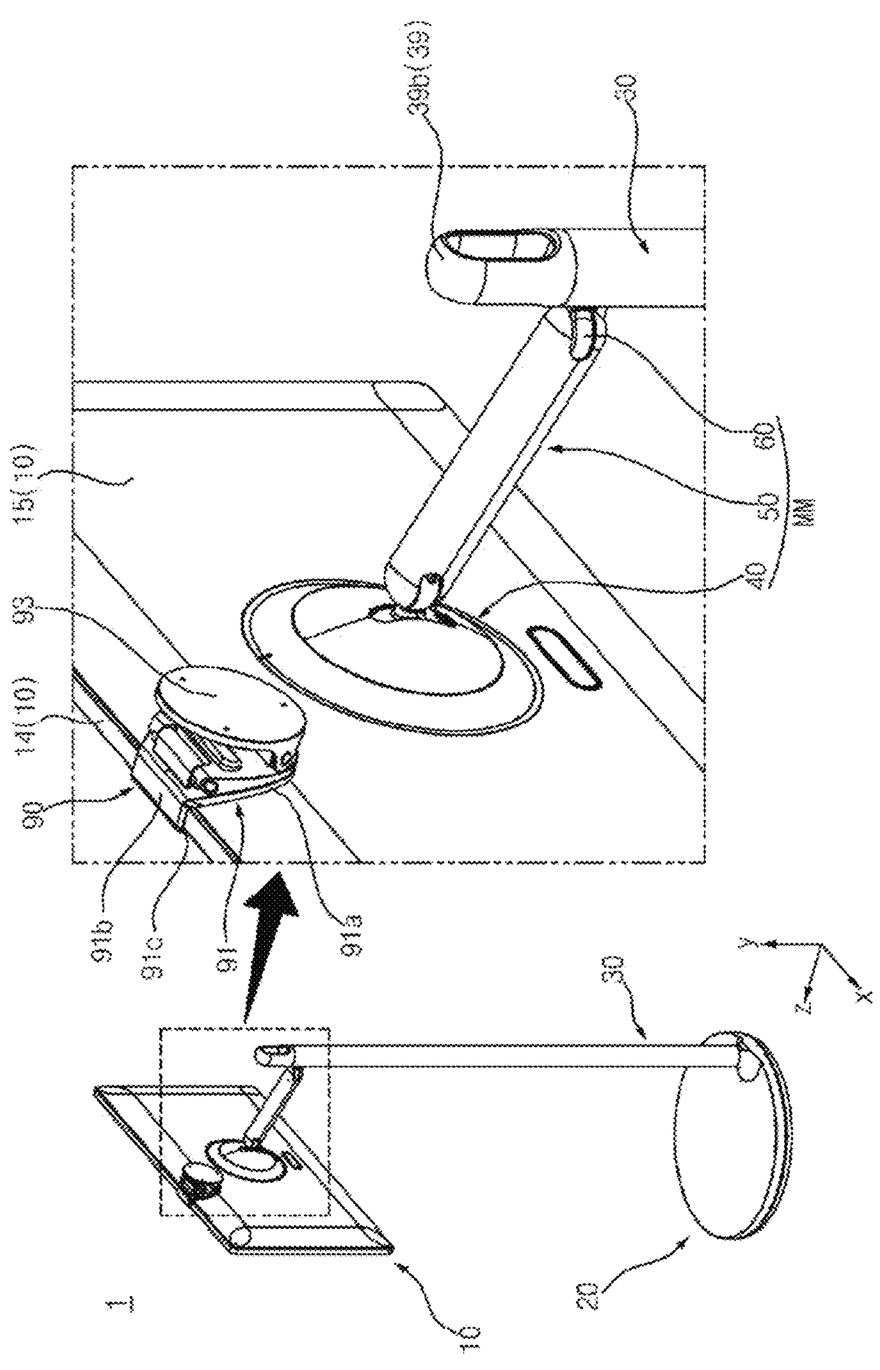

Referring to FIGS. 1 and 2, the image display device 1 may include a base 20, a pole 30, and a motion module MM.

The base 20 may have a generally flat cylindrical shape. The base 20 may be placed on a surface.

The pole 30 may be elongated vertically. A lower end of the pole 30 may be coupled onto the base 20. The pole 30 may be adjacent to a periphery of an upper surface of the base 20. A handle 39 may be coupled to an upper end of the pole 30. The pole 30 and the base 20 may be collectively referred to as a stand.

The motion module MM may extend in a direction intersecting the pole 30. One side of the motion module MM may be coupled to a rear side of the head 10. The other side of the motion module MM may be adjacent to the upper end of the pole 30 and may be coupled to the pole 30. An articulated connector 40 may be coupled to the rear side of the head 10, an elevating module 60 may be coupled to the pole 30, and an arm 50 may connect the articulated connector 40 and the elevating module 60.

Accordingly, the head 10 may be supported by the motion module MM, the pole 30, and the base 20, and may be spaced upward from the surface.

Figure 3:
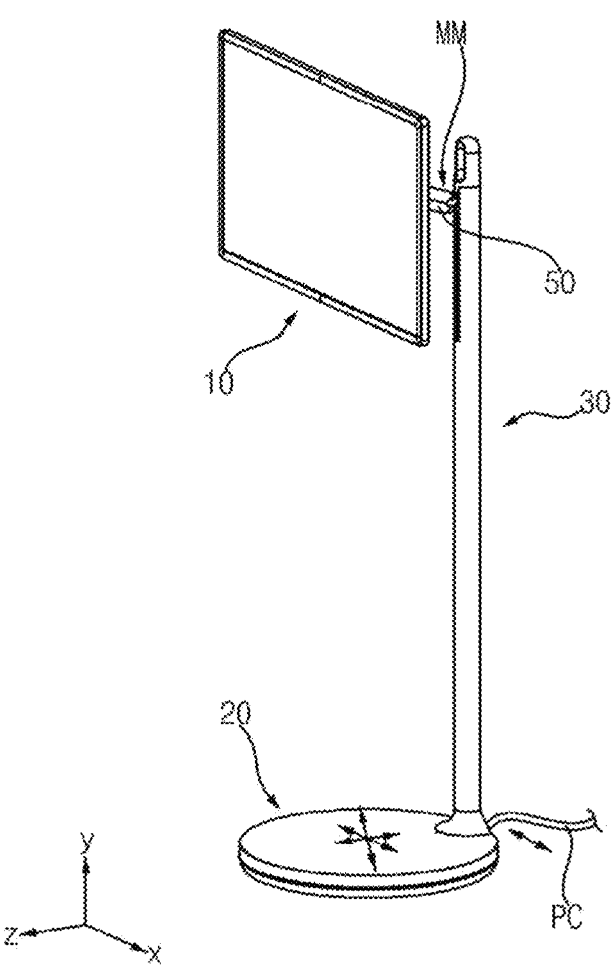

Referring to FIG. 3, a power cable PC may be connected to the base 20, and may provide external power to the head 10 and/or a battery mounted in the base 20. Alternatively, the power cable PC may be separated from the base 20, and the head 10 may be operated by power supplied from the battery mounted in the base 20.

Figure 4:
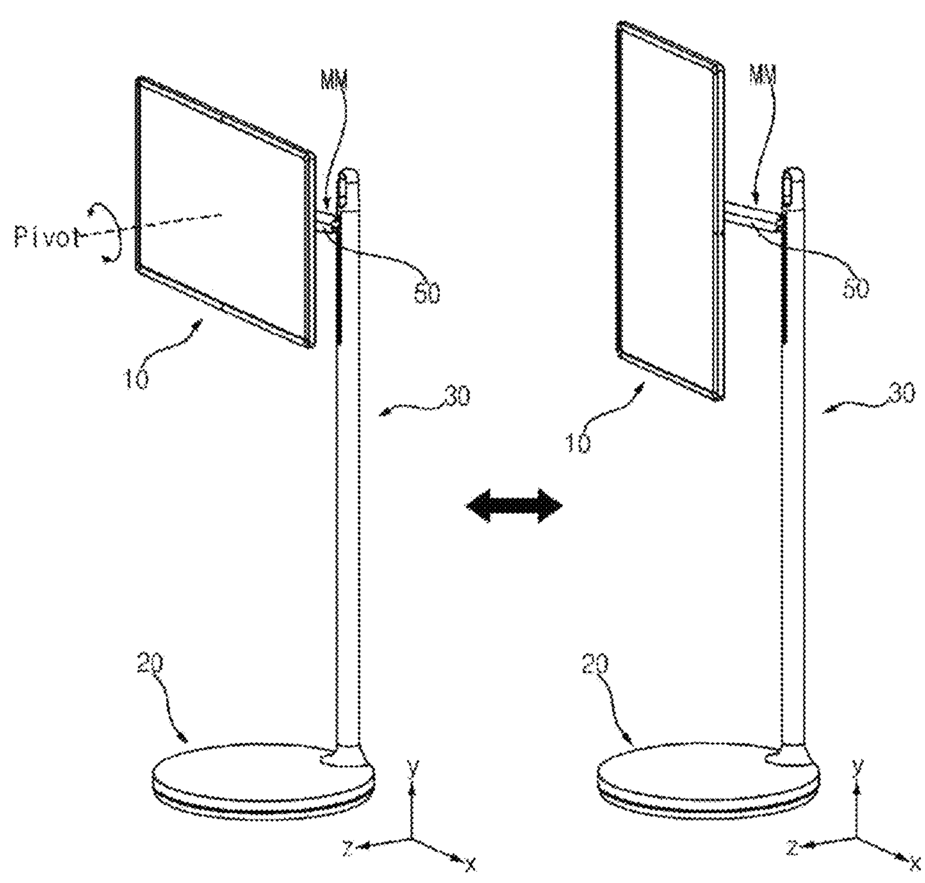

Referring to FIG. 4, the head 10 may be spaced upward from the base 20. A user can pivot the head 10. A pivot axis may pass through a center of the head 10 and may be orthogonal to the head 10. Referring to the left figure of FIG. 4, the head 10 may be placed in landscape mode. Referring to the right figure of FIG. 4, the head 10 may be placed in portrait mode.

Figure 5:
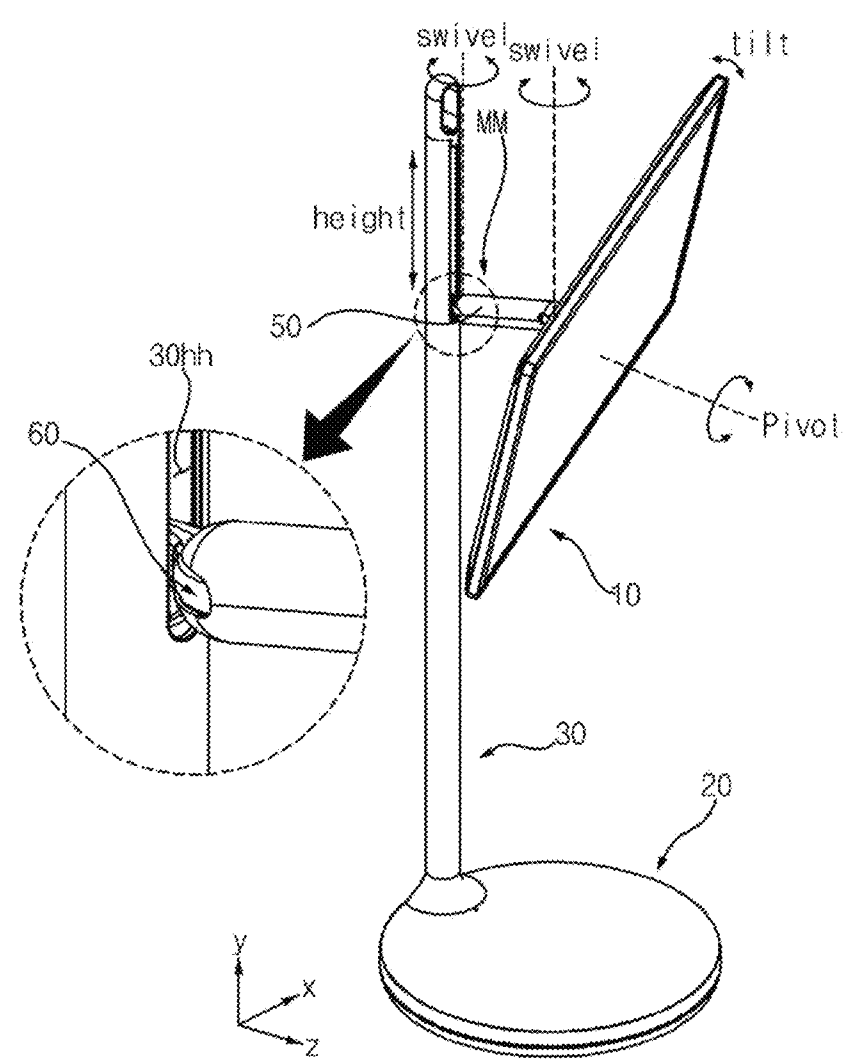

Referring to FIG. 5, a user can tilt the head 10. A tilt axis may be a horizontal axis that is located behind the center of the head 10 and parallel to the head 10. The user can swivel the head 10. A first swivel axis may be a vertical axis adjacent to one end of the arm 50. A second swivel axis may be a vertical axis adjacent to the other end of the arm 50. The user can raise or lower the head 10 from the pole 30.

The aforementioned pivoting, tilting, swiveling, and elevating operations of the head 10 may be implemented independently of each other. For example, the head 10 may be pivoted within a range of +90 degrees to −90 degrees. For example, the head 10 may be tilted within a range of +25 degrees to −25 degrees. For example, the head 10 may be swiveled within a range of +65 degrees to −65 degrees. For example, in the landscape mode, the head 10 may be located at 1,065 to 1,265 mm from the base 20 or the surface.

Figure 6:
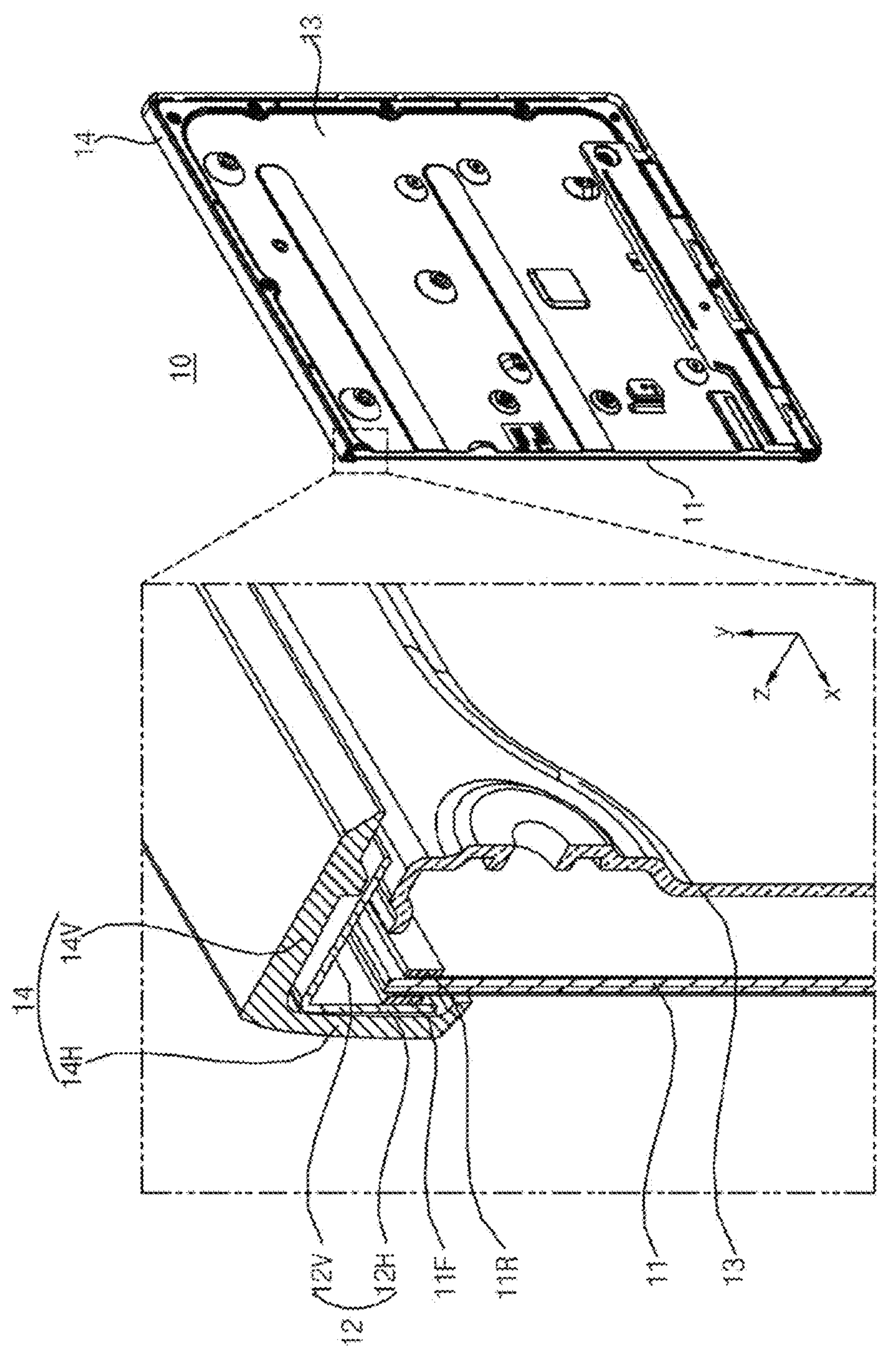

Referring to FIG. 6, the head 10 may include a display panel 11, a middle cabinet 12, a frame 13, an end frame 14, and a back cover 15.

The display panel 11 may define a front surface of the head 10. For example, the display panel 11 may be an OLED panel, an LCD panel, or an LED panel. The display panel 11 may include a plurality of pixels to output an image in accordance with color, brightness, and chroma of each pixel. The display panel 11 may be divided into an active area in which an image is displayed and a de-active area in which no image is displayed. The display panel 11 may generate light corresponding to red, green, or blue color according to a control signal.

The middle cabinet 12 may extend along a periphery of the display panel 11. A horizontal portion 12H may be positioned at the front of the display panel 11. A vertical portion 12V may intersect the horizontal portion 12H, and may cover a side surface of the display panel 11. For example, the middle cabinet 12 may include a metal or plastic material. The middle cabinet 12 may be referred to as a side frame or a guide panel.

The frame 13 may be positioned at the rear of the display panel 11. Electronic components such as a printed circuit board (PCB) may be coupled to a rear surface of the frame 13. For example, the frame 13 may include a metal material. The frame 13 may be referred to as a mount plate or a module cover.

The end frame 14 may define a periphery of the head 10. A horizontal portion 14H may be positioned at the front of the horizontal portion 12H of the middle cabinet 12. A vertical portion 14V may cover a side surface of the vertical portion 12V of the middle cabinet 12. For example, the end frame 14 may include a metal or plastic material.

The back cover 15 may define a rear surface of the head 10. The back cover 15 may cover the rear of the frame 13 and may be coupled to the frame 13.

Figure 7:
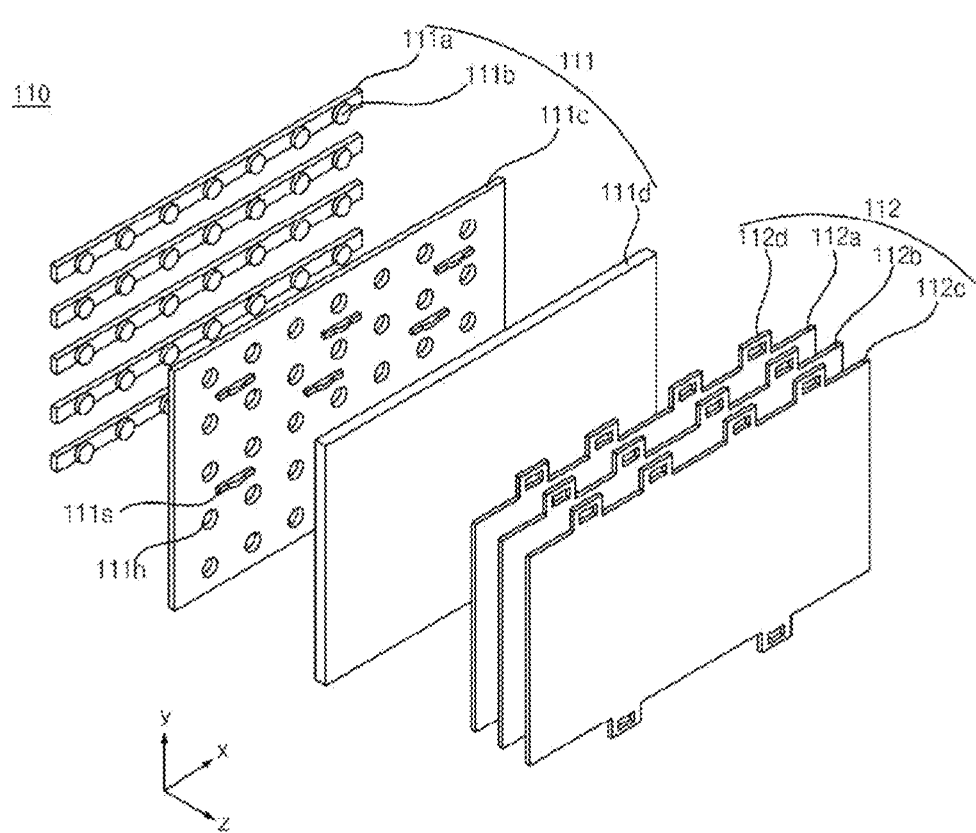

Referring to FIGS. 6 and 7, a backlight unit 110 may be disposed between the display panel 11 and the frame 13, and may be coupled to the frame 13. Here, the display panel 11 may be referred to as an LCD panel. The backlight unit 110 may include an optical layer 111 and an optical sheet 112. The optical layer 111 may include a substrate 111*a*, at least one light source 111*b*, a reflective sheet 111*c*, and a diffusion plate 111*d*.

The substrate 111*a* may be coupled to a front surface of the frame 13. The substrate 111*a* may have the shape of a plate or may be configured as a plurality of straps vertically spaced apart from each other. At least one light source 111*b* may be mounted on the substrate 111*a*. For example, the light source 111*b* may include a light emitting diode (LED). An electrode pattern for connecting an adapter and the light source 111*b* may be formed on the substrate 111*a*. The reflective sheet 111*c* may be positioned at the front of the substrate 111*a*. The reflective sheet 111*c* may have a hole 111*h* in which the light source 111*b* is disposed. The diffusion plate 111*d* may be positioned at the front of the reflective sheet 111*c*. A spacer 111*s* may support a rear surface of the diffusion plate 111*d* between the reflective sheet 111*c* and the diffusion plate 111*d*.

The optical sheet 112 may be positioned at the front of the diffusion plate 111*d*. A rear surface of the optical sheet 112 may be in close contact with the diffusion plate 111*d*, and a front surface of the optical sheet 112 may be in close contact with or adjacent to a rear surface of the display panel 11. The optical sheet 112 may include at least one of a diffusion sheet or a prism sheet. A coupling portion 112*d* may be formed on at least one edge of the optical sheet 112.

Accordingly, light from the light source 111*b* may be provided to the display panel 11 through the diffusion plate 111*d* and the optical sheet 112. Meanwhile, the display panel 11 of the present disclosure may be an OLED panel that does not require the backlight unit 110 described above or another type of panel.

Figure 8:
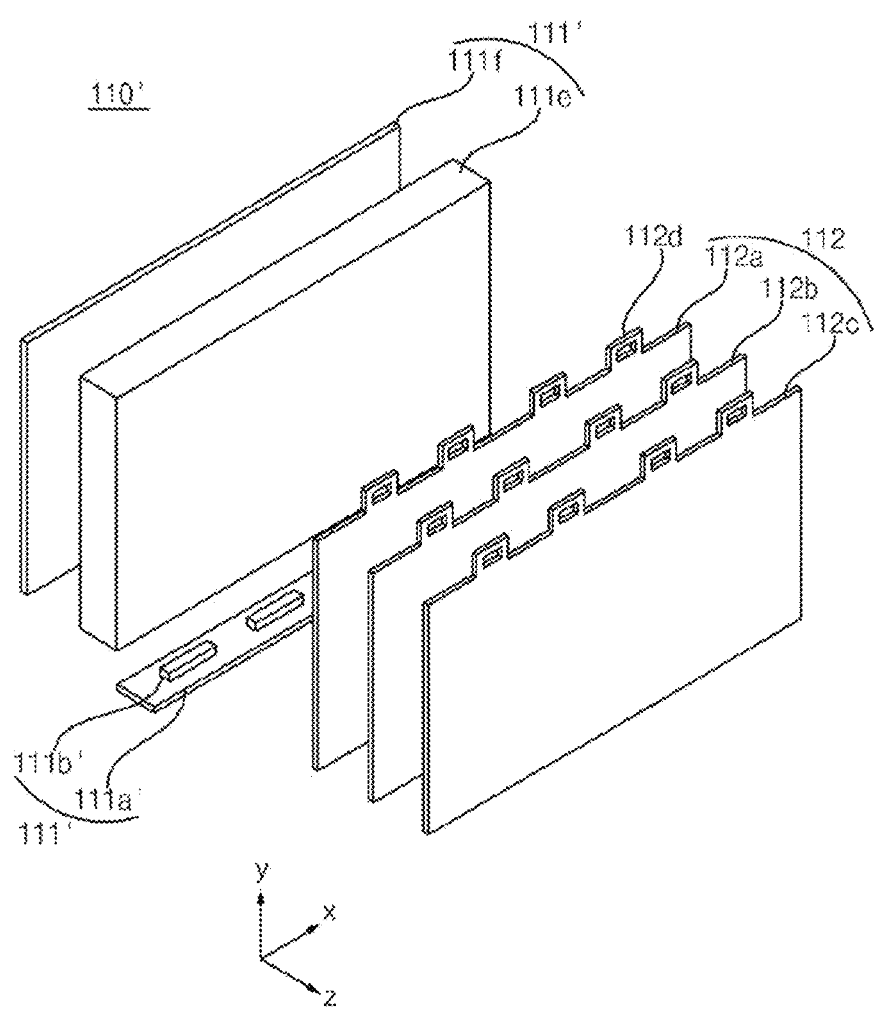

Referring to FIGS. 6 and 8, a backlight unit 110' may be disposed between the display panel 11 and the frame 13, and may be coupled to the frame 13. Here, the display panel 11 may be referred to as an LCD panel. The backlight unit 110' may include an optical layer 111' and an optical sheet 112. The optical layer 111' may include a substrate 111*a'*, at least one light source 111*b'*, a reflective sheet 111*f*, and a light guide plate 111*e*. The light guide plate 38 may be disposed between the frame 13 and the optical sheet 112, and may be supported by the frame 13.

The substrate 111*a'* may be adjacent to a periphery of the light guide plate 38, and may be coupled to the frame 13. At least one light source 111*b'* may be mounted on the substrate 111*a'*. For example, the light source 111*b'* may include a light emitting diode (LED). An electrode pattern for connecting an adapter and the light source 111*b'* may be formed on the substrate 111*a'*. The reflective sheet 111*f* may be disposed between the frame 13 and the light guide plate 111*e*, and may be supported by the frame 13.

Accordingly, light from the light source 111*b'* may be provided to the display panel 11 through the light guide plate 111*e* and the optical sheet 112. Meanwhile, the display panel 11 of the present disclosure may be an OLED panel that does not require the backlight unit 110' described above or another type of panel.

Figure 9:
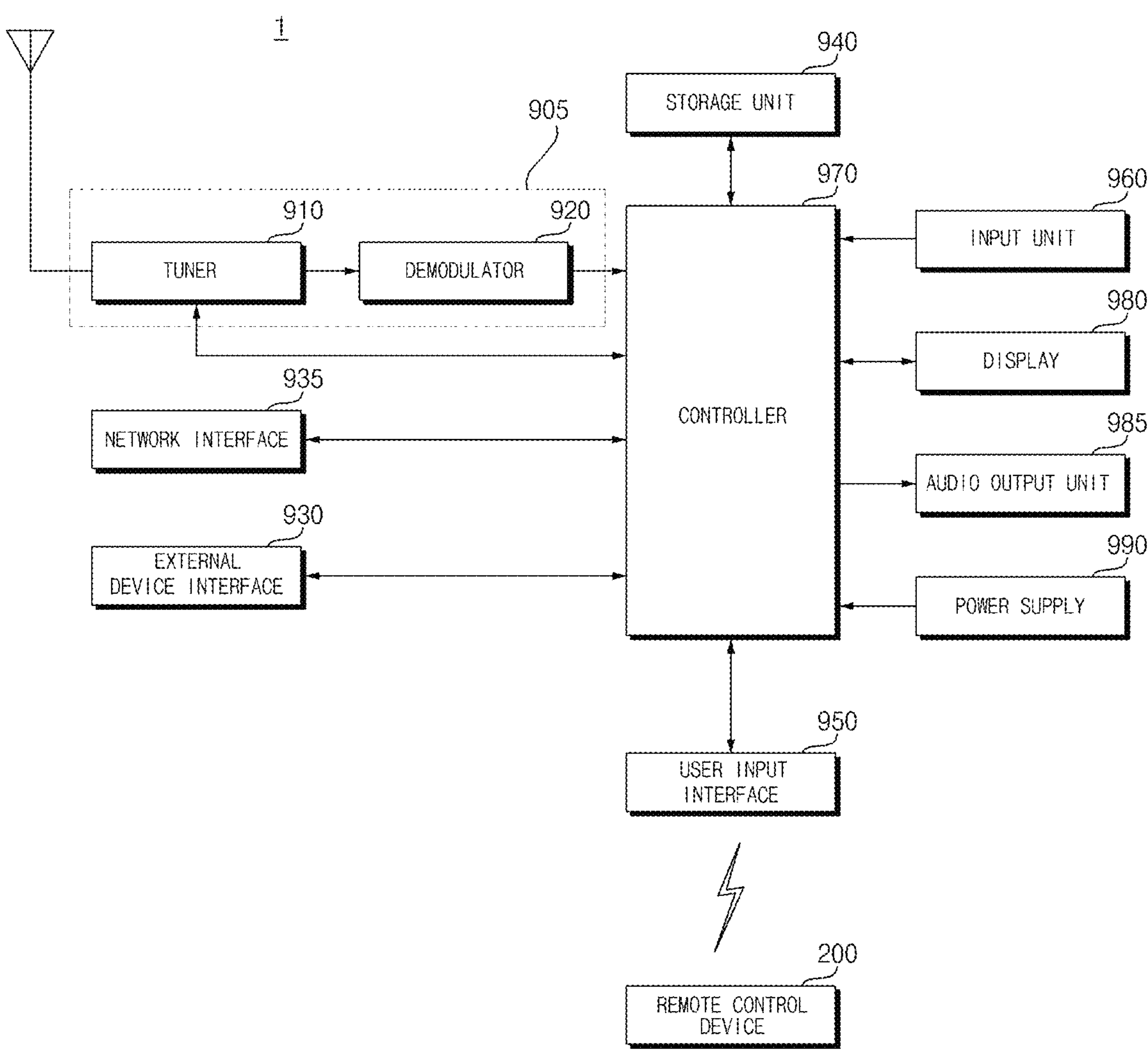
FIG. 9 is an internal block diagram according to an embodiment of the present disclosure.

Referring to FIG. 9, the image display device 1 may include a broadcast receiver 905, an external device interface 930, a network interface 935, a storage unit 940, a user input interface 950, an input unit 960, a controller (or control unit) 970, a display 980, an audio output unit 985, and/or a power supply 990.

The broadcast receiver 905 may include a tuner 910 and a demodulator 920.

Meanwhile, unlike the drawing, the image display device 1 may include only the broadcast receiver 905 and the external device interface 930, among the broadcast receiver 905, the external device interface 930, and the network interface 935. That is, the image display device 1 may not include the network interface 935.

The tuner 910 may select a broadcast signal corresponding to a channel selected by a user or each of all prestored channels from among broadcast signals received through an antenna (not shown) or a cable (not shown). The tuner 910 may convert the selected broadcast signal into an intermediate frequency (IF) signal or a baseband video or audio signal.

For example, when the selected broadcast signal is a digital broadcast signal, the tuner 910 may convert it into a digital IF signal (DIF), and when the selected broadcast signal is an analog broadcast signal, the tuner 910 may convert it into an analog baseband video or audio signal (CVBS/SIF). That is, the tuner 910 may may process a digital broadcast signal or an analog broadcast signal. The analog baseband video or audio signal (CVBS/SIF) output from the tuner 910 may be directly input to the controller 970.

The tuner 910 may sequentially select broadcast signals corresponding to all broadcast channels stored through a channel memory function from among the received broadcast signals, and may convert the selected broadcast signals into IF signals or baseband video or audio signals.

The tuner 910 may include a plurality of tuners to receive broadcast signals of a plurality of channels. Alternatively, the tuner 910 may be implemented as a signal tuner capable of simultaneously receiving broadcast signals of a plurality of channels.

The demodulator 920 may receive a digital IF signal (DIF) converted by the tuner 910 to demodulate the digital IF signal (DIF).

The demodulator 920 may perform demodulation and channel decoding and then may output a stream signal (TS). Here, the steam signal may be a multiplexed video signal, audio signal or data signal.

The stream signal output from the demodulator 920 may be input to the controller 970. The controller 970 may perform demultiplexing and video/audio signal processing, and then may output an image and sound through the display 980 and the audio output unit 985, respectively.

The external device interface 930 may transmit or receive data to or from an external device connected thereto. To this end, the external device interface 930 may include an A/V input and output unit (not shown).

The external device interface 930 may be connected, wired or wirelessly, to an external device such as a digital versatile disc (DVD) player, a Blu-ray player, a game console, a camera, a camcorder, a computer (e.g., a laptop), a set-top box, or the like, and may perform input/output operation with the external device.

In addition, the external device interface 930 may establish a communication network with various remote control devices 200 similar to shown in the drawing, and may receive a control signal associated with the operation of the image display device 1 from the remote control device 200 or to transmit data regarding the operation of the image display device 1 to the remote control device 200.

The A/V input and output unit may receive video and audio signals from the external device.

The external device interface 930 may include a wireless communication unit (not shown) for short-range communication with other electronic devices.

Such a wireless communication unit (not shown) may allow the external device interface 930 to exchange data with a mobile terminal nearby. In particular, the external device interface 930 may receive, from the mobile terminal, device information, information about an application that is being executed, an application image, and the like in a mirroring mode.

The network interface 935 may provide an interface for connecting the image display device 1 to a wired/wireless network including the Internet. For example, the network interface 935 may receive, over a network, content or data provided by a content provider or a network operator.

Meanwhile, the network interface 935 may include a communication module (not shown) to communicate with a wired/wireless network.

The storage unit 940 may store a program for processing and controlling each signal in the controller 970, or may store a signal-processed video (or image), audio, or data signal.

For example, the storage unit 940 may store application programs designed to perform various tasks that can be processed by the controller 970, and may selectively provide some of the stored application programs upon request by the controller 970.

The program or the like stored in the storage unit 940 is not particularly limited as long as it can be executed by the controller 970.

The storage unit 940 may perform a function of temporarily storing a video, audio, or data signal received from an external device through the external device interface 930.

The storage unit 940 may store information on predetermined broadcast channels through a channel memory function such as channel map, or the like.

Although FIG. 9 illustrates an example in which the storage unit 940 is provided separately from the controller 970, the scope of the present disclosure is not limited thereto. The storage unit 940 may be included in the controller 970.

The user input interface 950 may deliver a signal input by a user to the controller 970 or may deliver a signal from the controller 970 to the user.

For example, the user input interface 950 may transmit/receive a user input signal such as power on/off, channel selection, or screen setting to/from the remote control device 200, may transmit a user input signal input through a local key (not shown) such as a power key, a channel key, a volume key, or a setting key to the controller 970, may transmit a user input signal input from a sensor unit (not shown) that senses a user's gesture to the controller 970, or may transmit a signal from the controller 970 to the sensor unit.

The input unit 960 may be provided on one side of a body of the image display device 1. For example, the input unit 960 may include a touch pad, a physical button, etc.

The input unit 960 may receive various user commands related to the operation of the image display device 1, and may transmit a control signal corresponding to the received command to the controller 970.

The controller 970 may include at least one processor, and may control the overall operation of the image display device 1 using the processor included therein. Here, the processor may be a general processor such as a central processing unit (CPU). Alternatively, the processor may be a dedicated device such as an application-specific integrated circuit (ASIC), or any of other hardware-based processors.

The controller 970 may demultiplex a stream input through the tuner 910, the demodulator 920, the external device interface 930, or the network interface 935, or may process demultiplexed signals to generate and output a signal for image or audio output.

The display 980 may convert an image (or video) signal, a data signal, an on-screen display (OSD) signal or a control signal processed by the controller 970, or an image signal, a data signal or a control signal received from the external device interface 930 to generate a driving signal.

The display 980 may include a display panel (not shown) including a plurality of pixels.

The plurality of pixels provided in the display panel may include RGB subpixels. Alternatively, the plurality of pixels provided in the display panel may include RGBW subpixels. The display 980 may convert an image signal, a data signal, an OSD signal or a control signal processed by the controller 970 to generate a signal for driving the plurality of pixels.

The display 980 may be a plasma display panel (PDP) display, a liquid crystal display (LCD), an organic light-emitting diode (OLED) display, a flexible display, etc. Alternatively, the display 980 may be a three-dimensional (3D) display. The 3D display 980 may be classified as a non-glasses type and a glasses type.

Meanwhile, the display 980 may be configured as a touch screen and thus may be used not only as an output device but also as an input device.

The audio output unit 985 may receive an audio signal processed by the controller 970 to output sound.

The image signal processed by the controller 970 may be input to the display 980, allowing an image corresponding to the received image signal to be displayed. In addition, the image signal processed by the controller 970 may be input to an external output device through the external device interface 930.

The audio signal processed by the controller 970 may be output in the form of sound through the audio output unit 985. In addition, the audio signal processed by the controller 970 may be input to the external output device through the external device interface 930.

Although it is not illustrated in FIG. 9, the controller 370 may include a demultiplexer, an image processing unit, etc. This will be described with reference to FIG. 10.

Additionally, the controller 970 may control the overall operation of the image display device 1.

For example, the controller 970 may control the tuner 910 to tune a broadcast signal corresponding to a channel selected by a user or a prestored channel.

In addition, the controller 970 may control the image display device 1 in response to a command input by the user through the user input interface 950 or according to an internal program.

Meanwhile, the controller 970 may control the display 980 to display an image. Here, the image displayed on the display 980 may be a still image or a video, and may be a 2D image or a 3D image.

The controller 970 may control such that a predetermined 2D object is displayed in the image displayed on the display 980. For example, the object may be at least one of a connected web screen (e.g., newspaper or magazine), an electronic program guide (EPG), various menus, a widget, an icon, a still image, a video, and a text.

Meanwhile, the image display device 1 may further include a photographing unit (not shown). The photographing unit may photograph a user. The photographing unit may be configured as a single camera, but is not limited thereto, and may be configured as a plurality of cameras. The photographing unit may be embedded in the image display device 1, namely, at an upper portion of the display 980, or may be provided separately. Information of an image captured by the photographing unit may be input to the controller 970.

The controller 970 may determine the location of a user based on an image captured by the photographing unit. For example, the controller 970 may identify a distance (z-axis coordinate) between the user and the image display device 1. In addition, the controller 970 may determine the x-axis coordinate and the y-axis coordinate in the display 980 that correspond to the location of the user.

The controller 970 may detect a user's gesture based on an image captured by the photographing unit, or each of signals sensed by the sensor unit or a combination thereof.

The power supply 990 may supply corresponding power throughout the image display device 1. In particular, the power supply 990 may supply power to the controller 970, which can be implemented as a system-on-chip (SOC), the display 980 for displaying an image, and the audio output unit 985 for audio output.

Specifically, the power supply 990 may include a converter (not shown) for converting alternating-current (AC) power to direct-current (DC) power, and a DC/DC converter (not shown) for converting the level of DC power.

The remote control device 200 may transmit a user input to the user input interface 950. To this end, the remote control device 200 may use Bluetooth, Radio Frequency (RF) communication, Infrared Radiation (IR) communication, Ultra-Wideband (UWB), ZigBee, or the like. In addition, the remote control device 200 may receive a video, audio, or data signal output from the user input interface 950 to output the received signal in the form of an image or sound.

Meanwhile, the image display device 1 described above may be a digital broadcast receiver capable of receiving a fixed or mobile digital broadcast.

Meanwhile, the block diagram of the display device 1 shown in FIG. 9 is merely one embodiment of the present disclosure, and the respective components of the display device 1 may be combined, added, or omitted according to the specification of the image display device 1 that is actually implemented.

In other words, as necessary, two or more components may be combined into one component, or one component may be subdivided into two or more components. In addition, the function performed in each block is merely illustrative, and a specific operation or configuration thereof does not limit the scope of the present disclosure.

Figure 10:
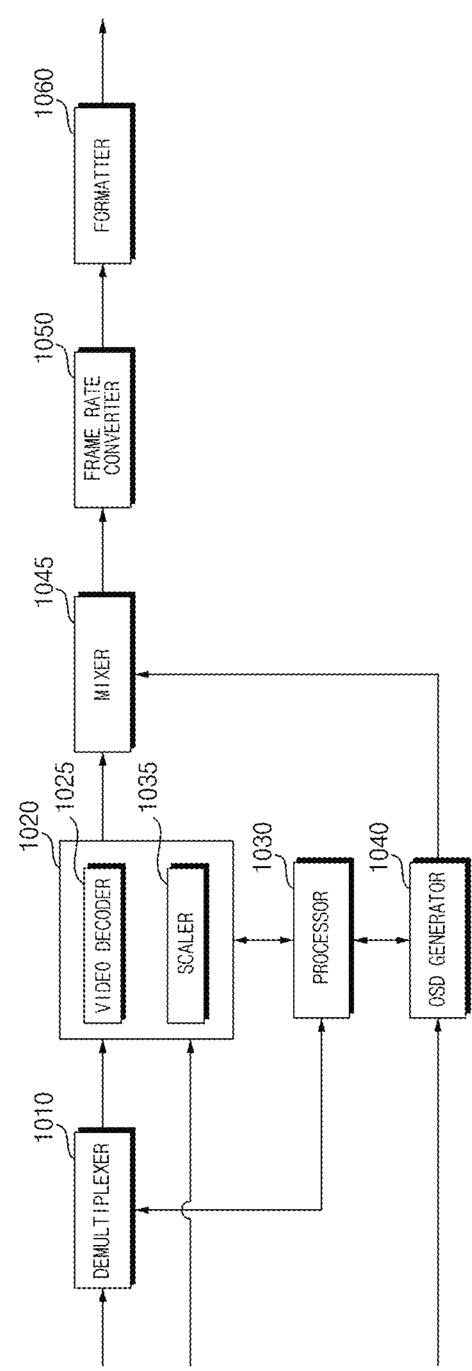
FIG. 10 is a view for explaining a controller of FIG. 9.

Referring to FIG. 10, the controller 970 according to an embodiment of the present disclosure may include a demultiplexer 1010, an image processing unit 1020, a processor 1030, an OSD generator 1040, a mixer 1045, a frame rate converter 1050, and/or a formatter 1060. The controller 970 may further include an audio processing unit (not shown) and a data processing unit (not shown).

The demultiplexer 1010 may demultiplex an input stream. For example, the demultiplexer 1010 may demultiplex an MPEG-2 TS into an image (or video) signal, an audio signal, and a data signal. Here, the stream signal input to the demultiplexer 310 may be a stream signal output from the tuner 910, the demodulator 920, or the external device interface 930.

Th image processing unit 1020 may process the demultiplexed image signal. To this end, the image processing unit 1020 may include a video decoder 1025 and a scaler 1035.

The video decoder 1025 may decode the demultiplexed image signal, and the scaler 1035 may perform scaling to allow the resolution of the decoded image signal to be displayed on the display 180.

The video decoder 1025 may include decoders of various standards. For example, the video decoder 1025 may include an MPEG-2 decoder, an H.264 decoder, a 3D video decoder for a color image and a depth image, a decoder for multiview images, etc.

The processor 1030 may control the overall operation of the image display device 1 or the controller 970. For example, the processor 1030 may control the tuner 910 to tune a broadcast corresponding to a channel selected by a user or a prestored channel.

Additionally, the processor 1030 may control the image display device 1 according to a user command input through the user input inface 950 or according to an internal program.

Additionally, the processor 1030 may control data transmission with the network interface 935 or the external device interface 930.

Additionally, the processor 1030 may control the operation of the demultiplexer 1010, the image processing unit 1020, the OSD generator 1040, and the like in the controller 970.

The OSD generator 1040 may generate an OSD signal autonomously or according to a user input. For example, based on a user input signal input through the input unit 960, the OSD generator 1040 may generate a signal for displaying various kinds of information as a graphic or text on the screen of the display 180.

The generated OSD signal may include various data such as a user interface screen of the image display device 1, various menu screens, widgets, icons, and the like. In addition, the generated OSD signal may include a 2D object or a 3D object.

In addition, the OSD generator 1040 may generate a pointer that can be displayed on the display 180 based on a pointing signal received from the remote control device 200.

The OSD generator 1040 may include a pointing signal processor (not shown) to generate a pointer. The pointing signal processor (not shown) may be provided separately, instead of being provided in the OSD generator 240.

The mixer 1045 may mix the OSD signal generated by the OSD generator 1040 and the decoded image signal processed by the image processing unit 1020. The mixed image signal may be provided to the frame rate converter 1050.

The frame rate converter (FRC) 1050 may convert the frame rate of an input image. Alternatively, the frame rate converter 1050 may output an input image without any frame rate conversion.

The formatter 1060 may arrange a left-eye image frame and a right-eye image frame of the frame rate converted 3D image. The formatter 1060 may output a synchronization signal Vsync to open the left eye glass and the right eye glass of a 3D viewing device (not shown).

Meanwhile, the formatter 1060 may change the format of an input image signal to an image signal suitable for being displayed on the display 180.

In addition, the formatter 1060 may change the format of a 3D image signal. For example, the formatter 1060 may change the format of a 3D image signal to one of various 3D formats such as a side-by-side format, a top/down format, a frame sequential format, an interlaced format, and a checker box format.

Meanwhile, the formatter 1060 may convert a 2D image signal into a 3D image signal. For example, according to a 3D image generation algorithm, the formatter 1060 may detect an edge or a selectable object in a 2D image signal, and separate and generate an object according to the detected edge or the selectable object as a 3D image signal. Here, the generated 3D image signal may be separated into a left-eye image signal L and a right-eye image signal R to be aligned, as described above.

Although not shown in the drawing, a 3D processor (not shown) for 3-dimensional (3D) effect signal processing may be further provided after the formatter 1060. Such a 3D processor may perform brightness, tint, and color adjustment to improve 3D effects. For example, the 3D processor may perform signal processing to make the near clear and the far blurry. Meanwhile, the function of the 3D processor may be integrated into the formatter 1060 or the image processing unit 1020.

Meanwhile, the audio processing unit (not shown) in the controller 970 may process a demultiplexed audio signal. To this end, the audio processing unit (not shown) may include various decoders.

The audio processing unit (not shown) in the controller 970 may perform bass, treble, and volume adjustment.

The data processing unit (not shown) in the controller 970 may perform data processing on a demultiplexed data signal. For example, when the demultiplexed data signal is an encoded data signal, the data processing unit may decode it. The encoded data signal may be electronic program guide (EPG) information including broadcasting information such as the start time and end time of broadcast programs aired on each channel.

Meanwhile, the block diagram of the controller 970 shown in FIG. 10 is merely one example of the present disclosure. The respective components of the block diagram may be combined, added, or omitted depending on the specification of the controller 970 that is actually implemented.

In particular, the frame rate converter 1050 and the formatter 1060 may not be provided in the controller 970. Instead, the frame rate converter 1050 and the formatter 1060 may be respectively provided separately from the controller 970 or may be provided as a single module separately from the controller 970.

Figure 11A:
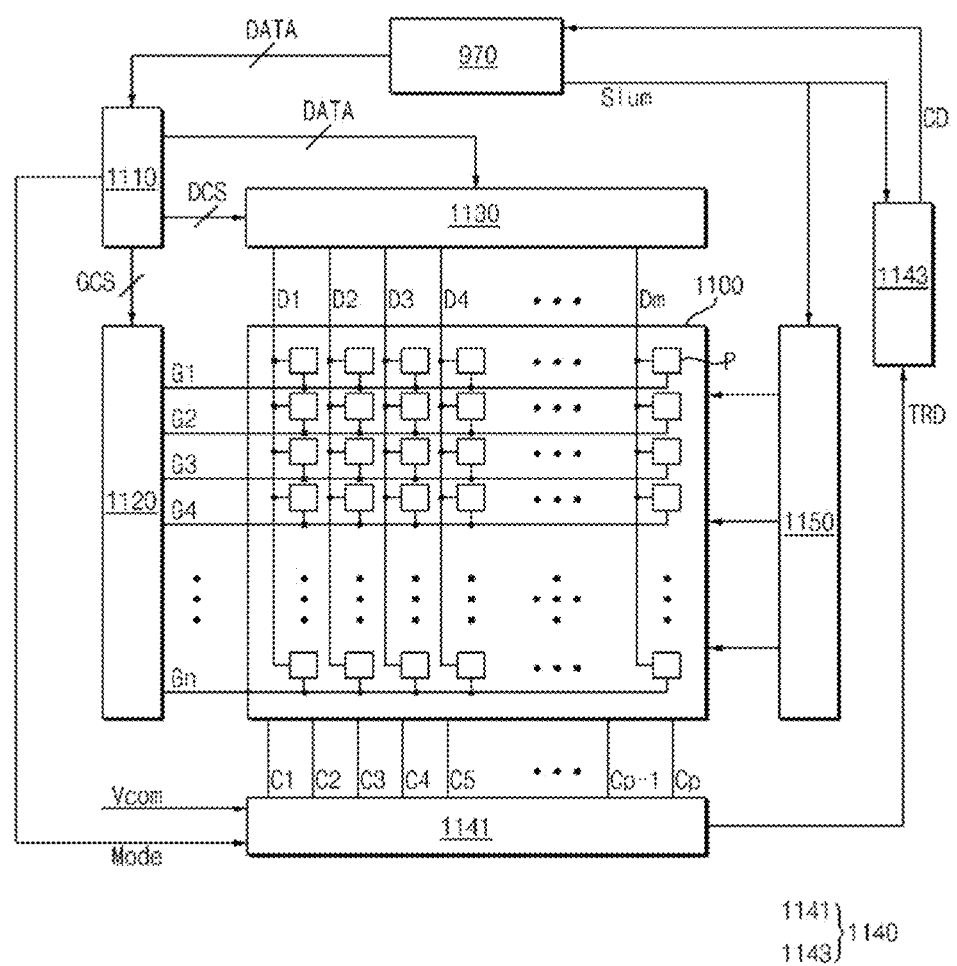
FIGS. 11A and 11B are views for explaining a display of FIG. 9.
Figure 11B:
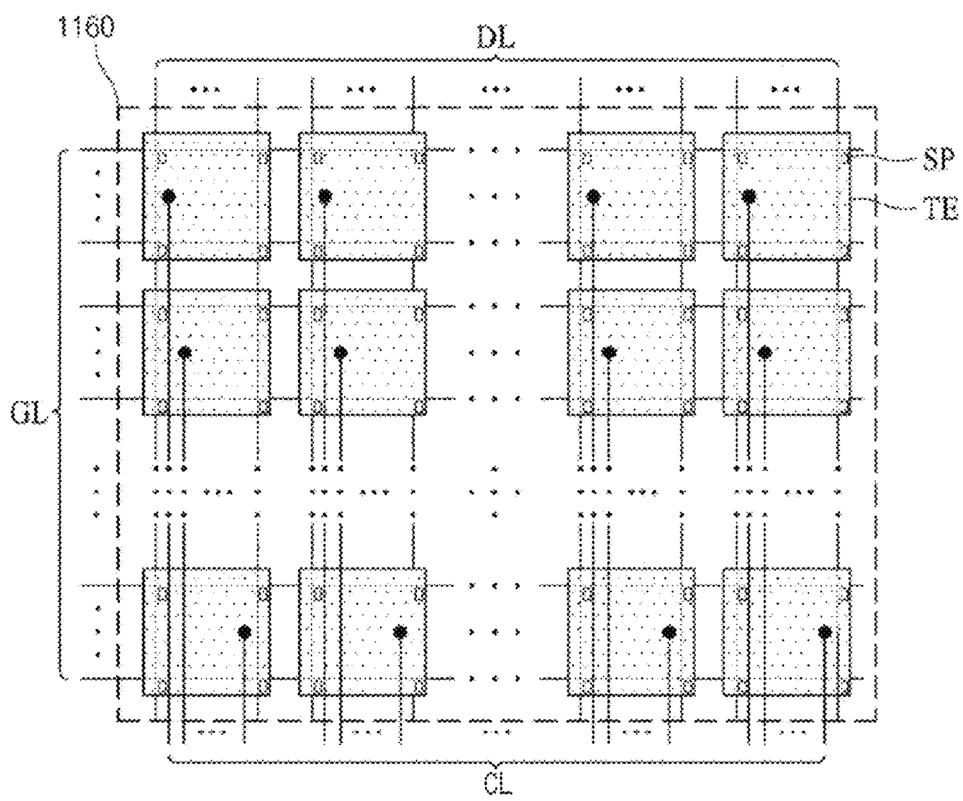

Referring to FIGS. 11A and 11B, the display 980 may include a display panel 1100, a timing controller 1110, a gate driver 1120, a data driver 1130, a touch module 1140, and/or a backlight module 1150.

The display panel 1100 may include a plurality of pixels P. The plurality of pixels P may be connected to a plurality of gate lines GL (G1 to Gn) and a plurality of data lines DL (D1 to Dm) that are arranged in a matrix to intersect one another. A plurality of thin film transistors (TFTs) may be disposed at the intersections of the plurality of gate lines GL and data lines DL. The plurality of pixels P may be formed at the intersections of the plurality of data lines DL and the plurality of gate lines G1 to Gn. Each of the plurality of pixels P may be connected to the data line and the gate line. The plurality of pixels P may be formed in an entire screen area 1160 in which an image is displayed.

When the image display device 1 is an LCD device, a plurality of pixels may include a liquid crystal layer. When the image display device 1 is an OLED display device, a plurality of pixels may include an organic light emitting diode (OLED). Herein, the image display device 1 is described using an LCD device, but the present disclosure is not limited thereto.

The timing controller 1110 may receive a control signal, an image signal, or the like from the controller 970. The timing controller 1110 may control the gate driver 1120 and/or the data driver 1130 in response to the control signal. The timing controller 1110 may relocate the image signal according to the specification of the data driver 1130 and then transmit it to the data driver 1130.

The gate driver 1120 and the data driver 1130 may supply a scan signal and an image signal to the display panel 1100 through the gate line GL and the data line DL, under the control of the timing controller 1110. For example, the gate driver 1120 may generate a signal according to a gate control signal GCS received from the timing controller 1110. In this case, the gate driver 1120 may supply the signal generated according to the gate control signal GCS to the gate lines GL in a predetermined order. For example, according to a data control signal DCS received from the timing controller 1110, the data driver 1130 may generate an analog signal corresponding to image data DATA. In this case, the data driver 1130 may supply the analog signal generated according to the data control signal DCS to the data lines DL in a predetermined order.

Meanwhile, the data driver 1130 may include a plurality of source driver integrated circuits (ICs) (not shown) corresponding to the plurality of data lines DL.

The display 980 may include a plurality of touch electrodes TE connected to a plurality of touch driving lines CL (C1 to Cp). The display 980 may be implemented as an in-cell type in which the plurality of touch electrodes TE are included in the display panel 1100, but is not limited thereto. For example, the display panel 1100 may be implemented as an on-cell type in which the plurality of touch electrodes TE are provided on the display panel 1100. Herein, it is described that the display 980 is implemented as a self-capacitance type, but the present disclosure is not limited thereto. For example, the display 980 may be implemented using other capacitive methods such as a mutual capacitance method.

The data line DL and the touch driving line CL may be disposed parallel to each other. The data line DL and the touch driving line CL may intersect the gate line GL.

The touch module 1140 may include a touch driving circuit 1141 and/or a touch coordinate calculator 1143.

The touch driving circuit 1141 may be electrically connected to the touch electrode TE through the touch driving line CL. The plurality of touch electrodes TE may be respectively connected to the respective plurality of touch driving lines CL.

In a display mode that outputs an image, the plurality of touch electrodes TE may receive a common voltage Vcom from the touch driving circuit 1141 through the touch driving line CL. When the common voltage Vcom is supplied to the touch electrode TE, the touch electrode TE may serve as a common electrode.

In a sensing mode that detects a touch, the plurality of touch electrodes TE may receive a touch driving signal from the touch driving circuit 1141 through the touch driving line CL. The touch driving signal may be a pulse signal. The touch driving circuit 1141 may supply a driving signal to the plurality of touch driving lines C1 to Cp in a predetermined order.

The display mode may be performed for each preset display period in one frame. In this case, the sensing mode may be performed for each sensing period set between the display periods. The timing controller 1110 may generate a mode signal MODE to distinguish between the display period and the touch period. The timing controller 1110 may output the mode signal MODE to the touch driving circuit 1141.

The touch driving circuit 1141 may detect a voltage of the touch electrode TE. The voltage of the touch electrode TE may correspond to capacitance of the touch electrode TE. The touch driving circuit 1141 may generate raw data TRD corresponding to the capacitance of the touch electrode TE. The touch driving circuit 1141 may output the raw data TRD to the touch coordinate calculator 1143.

The touch coordinate calculator 1143 may receive the raw data TRD from the touch driving circuit 1141. The touch coordinate calculator 1143 may determine whether the raw data TRD received from the touch driving circuit 1141 is greater than or equal to a predetermined reference value for touch (hereinafter referred to as a "touch reference value"). Here, the touch reference value may be a predetermined value corresponding to the capacitance of the touch electrode TE.

Based on the received raw data TRD being greater than or equal to the touch reference value, the touch coordinate calculator 1143 may determine that a user's touch has occurred. For example, the touch coordinate calculator 1143 may determine coordinates of the touch electrode TE corresponding to the raw data TRD greater than or equal to the touch reference value as coordinates where the user's touch is made.

The touch coordinate calculator 1143 may output, to the controller 970, data CD regarding the coordinates where the user's touch is made. The controller 970 may determine the user's touch based on the data CD received from the touch coordinate calculator 1143. The controller 970 may perform an operation related to the touch based on the data CD received from the touch coordinate calculator 1143. For example, based on a user's touch being detected while an image is output via the display 980, the controller 970 may output a user interface related to the image via the display 980. Meanwhile, the touch coordinate calculator 1143 may be included in the controller 970 or the timing controller 1100.

The backlight module 1150 may supply light to the display panel 1100. To this end, the backlight module 1150 may include at least one light source (e.g., the light source 111*b* of FIG. 7) configured to emit light, a scan driver (not shown) configured control scanning driving of the light source, and/or a light source driver (not shown) configured to turn on/off the light source.

The backlight module 1150 may include a plurality of light sources. The plurality of light sources may be arranged to correspond to a plurality of screen areas constituting the entire screen area 1160. The backlight module 1150 may adjust brightness of the plurality of light sources. For example, the light source driver may turn on or off each of the plurality of light sources to adjust luminance of each of the plurality of screen areas.

The plurality of touch electrodes TE may correspond to the plurality of screen areas. The touch coordinate calculator 1143 may set a touch reference value to correspond to each of the plurality of screen areas. For example, the touch coordinate calculator 1143 may set the touch reference value for the touch electrode TE corresponding to a first screen area to a first capacitance, and may set the touch reference value for the touch electrode TE corresponding to a second screen area to a second capacitance.

The controller 970 may determine brightness of the light source included in the backlight module 1150. For example, the controller 970 may determine a target luminance of the display 980 based on a user input regarding luminance received via the input unit 960. In this case, the controller 970 may determine the brightness of the light source corresponding to the determined target luminance. The controller 970 may increase a brightness level of the light source in proportion to an increase in the target luminance. In one embodiment, when the backlight module 1150 includes a plurality of light sources, the controller 970 may determine brightness of each of the plurality of light sources. For example, the controller 970 may determine the brightness of each of the plurality of light sources corresponding to a target luminance of each of the plurality of screen areas.

The controller 970 may output a control signal Slum corresponding to the brightness of the light source (hereinafter referred to as a "brightness control signal"). The brightness control signal Slum may be input to the touch module 1140 and/or the backlight module 1150. The brightness control signal Slum may be a pulse width modulation (PWM) signal with a duty ratio corresponding to the brightness of the light source. For example, the duty ratio of the brightness control signal Slum may increase in proportion to an increase in the brightness of the light source. In one embodiment, when the backlight module 1150 includes a plurality of light sources, the controller 970 may output a brightness control signal Slum corresponding to each of the plurality of light sources.

In one embodiment, the controller 970 may output the brightness control signal Slum based on an ambient brightness of the image display device 1. The image display device 1 may include an illuminance sensor to detect the ambient brightness of the image display device 1. The controller 970 may determine a target luminance of the display 980 based on the ambient brightness of the image display device 1 detected via the illuminance sensor. For example, the controller 970 may increase the target luminance of the display 980 as the ambient brightness of the image display device 1 becomes brighter. The controller 970 may determine brightness of the light source based on the target luminance of the display 980 determined according to the ambient brightness of the image display device 1.

The touch module 1140 may set a touch reference value based on the brightness of the light source. The touch module 1140 may set a touch reference value based on the duty ratio of the brightness control signal Slum corresponding to the brightness of the light source. The touch reference value may correspond to the capacitance of the touch electrode TE. For example, based on the brightness control signal Slum corresponding to a first brightness level, the touch coordinate calculator 1143 may set the touch reference value to a first capacitance. For example, based on the brightness control signal Slum corresponding to a second brightness level higher than the first brightness level, the touch coordinate calculator 1143 may set the touch reference value to a second capacitance lower than the first capacitance.

In one embodiment, when the backlight module 1150 includes a plurality of light sources, the controller 970 may set a touch reference value for the screen area corresponding to each of the plurality of light sources. For example, the controller 970 may set a touch reference value for the capacitance of the touch electrode TE disposed in the screen area corresponding to each of the plurality of light sources.

The backlight module 1150 may adjust the brightness of the light source based on the brightness control signal Slum corresponding to the brightness of the light source. For example, the light source driver may control On/Off of the light source based on the duty ratio of the brightness control signal Slum corresponding to the brightness of the light source. In one embodiment, when the backlight module 1150 includes a plurality of light sources, the light source driver may control On/Off of each of the plurality of light sources based on the brightness control signal Slum corresponding to each of the plurality of light sources.

The power supply 990 may output a common voltage Vcom supplied to the display panel 1100. For example, the power supply 990 may supply the common voltage Vcom to the touch driving circuit 1141. The power supply 990 may supply a gamma voltage to the data driver 1130. The power supply 990 may supply driving power for driving the light source to the backlight unit 1150.

Figure 12:
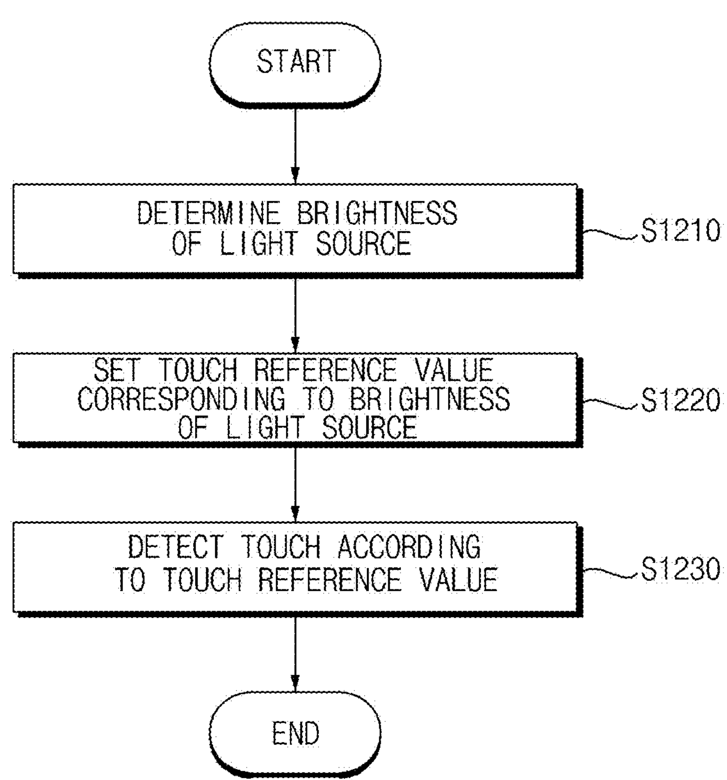
FIG. 12 is a flowchart illustrating a method for operating an image display apparatus according to an embodiment of the present disclosure.

FIG. 12 is a flowchart illustrating a method for operating an image display device according to an embodiment of the present disclosure.

Referring to FIG. 12, in operation S1210, the image display device 1 may determine brightness of a light source. The image display device 1 may determine a target luminance of the display 980. The image display device 1 may determine the brightness of the light source corresponding to the determined target luminance. For example, the controller 970 of the image display device 1 may output a brightness control signal Slum corresponding to the brightness of the light source. In one embodiment, when the backlight module 1150 includes a plurality of light sources, the image display device 1 may determine brightness of each of the plurality of light sources.

Figure 13:
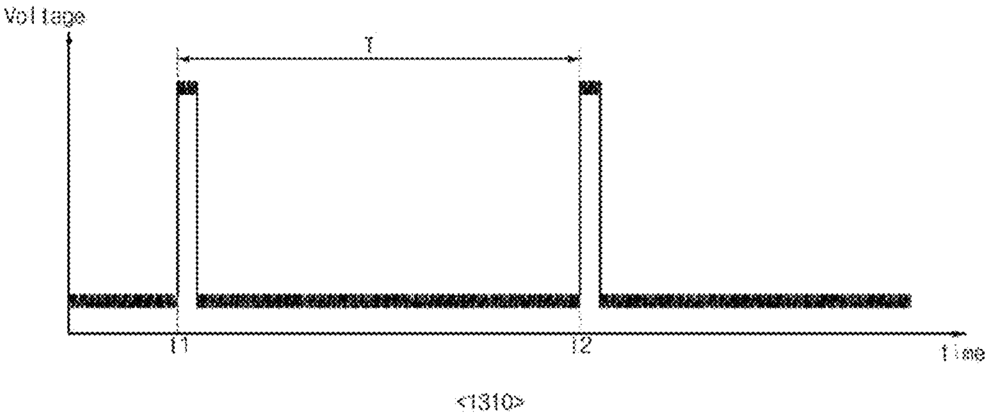
FIGS. 13 to 16 are views for explaining a method for operating an image display apparatus according to an embodiment of the present disclosure.
Figure 13:
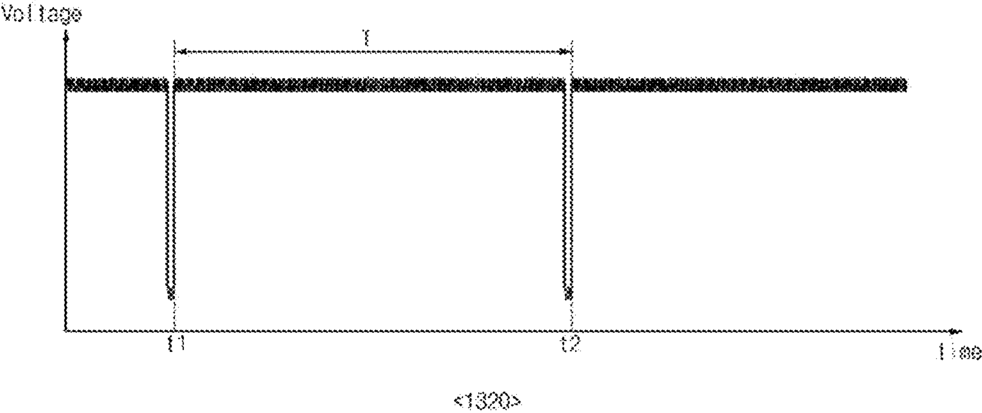

Referring to FIG. 13, a duty ratio of the brightness control signal Slum may correspond to the brightness of the light source. Referring to reference numeral 1310, based on the brightness of the light source being determined as a first brightness level, the duty ratio of the brightness control signal Slum may be determined as a first duty ratio. Meanwhile, referring to reference numeral 1320, based on the brightness of the light source being determined as a second brightness level higher than the first brightness level, the duty ratio of the brightness control signal Slum may be determined as a second duty ratio greater than the first duty ratio. That is, the higher the brightness level of the light source, the longer the high-level brightness control signal Slum is output during a first time period T.

In operation S1220, the image display device 1 may set a touch reference value corresponding to the brightness of the light source. For example, the image display device 1 may set the touch reference value to a first capacitance based on the brightness of the light source corresponding to a first brightness level. For example, the image display device 1 may set the touch reference value to a second capacitance lower than the first capacitance based on the brightness of the light source corresponding to a second brightness level higher than the first brightness level.

In one embodiment, when the backlight module 1150 includes a plurality of light sources, based on brightness of each of the plurality of light sources, the image display device 1 may set the touch reference value for a plurality of screen areas corresponding to the plurality of light sources.

In operation S1230, the image display device 1 may detect a user's touch according to the set touch reference value corresponding to the brightness of the light source. For example, according to the set touch reference value corresponding to the brightness of the light source, the image display device 1 may determine coordinates where the user's touch has occurred.

Figure 14:
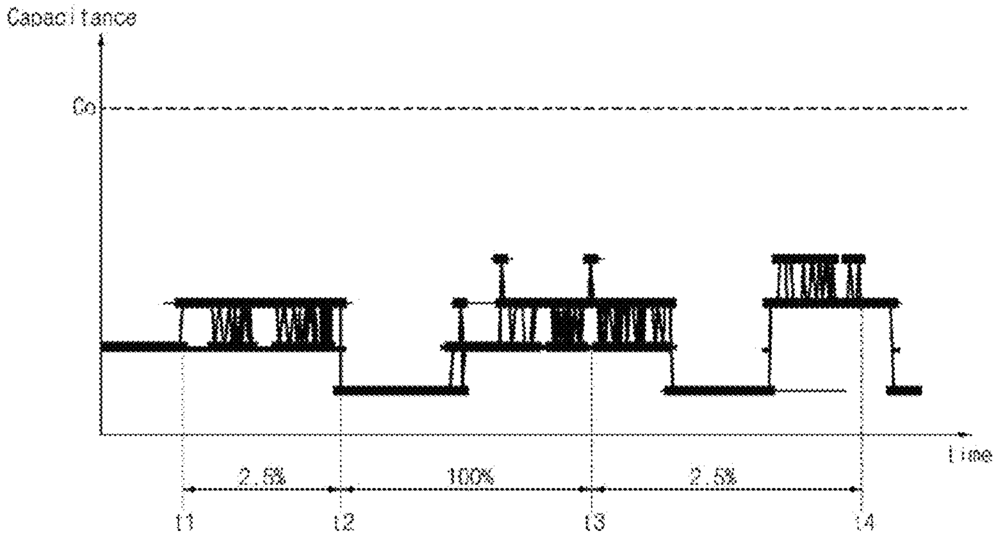

Referring to FIG. 14, when the display 980 operates normally, raw data TRD output from the touch driving circuit 1141 while a user's touch does not occur may be detected below a predetermined capacitance C0 set as the touch reference value. In this case, although the brightness of the light source changes according to the duty ratio of the brightness control signal Slum, the raw data TRD may be less than the predetermined capacitance C0.

Figure 15:
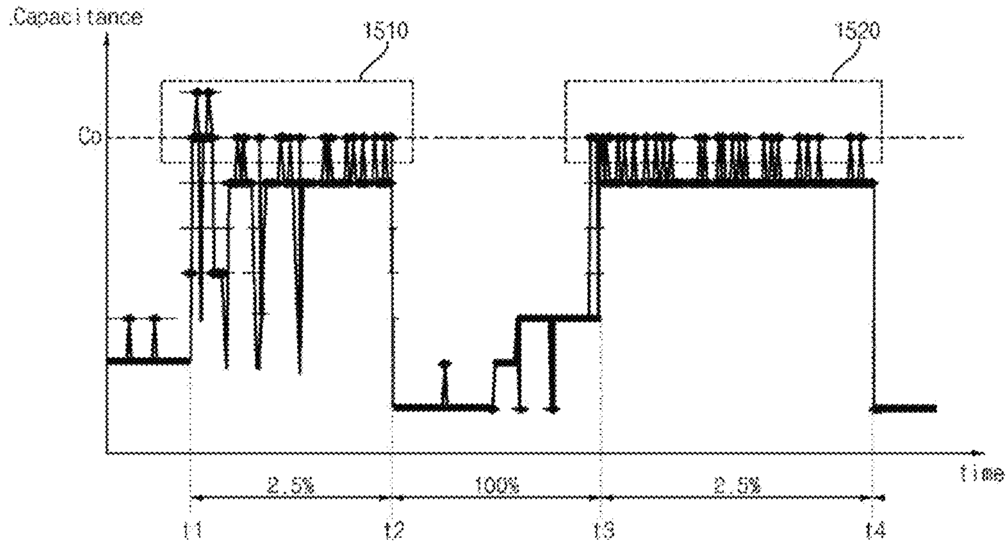

Meanwhile, referring to FIG. 15, when the display 980 operates abnormally due to manufacturing tolerances or the like, although a user's touch does not occur, raw data TRD output from the touch driving circuit 1141 may be detected at or above a predetermined capacitance C0 set as the touch reference value. As the duty ratio of the brightness control signal Slum decreases, the frequency with which raw data TRD is detected at or above the predetermined capacitance C0 may increase. In this case, even when a user's touch does not occur, the image display device 1 may determine that a touch has occurred.

Figure 16:
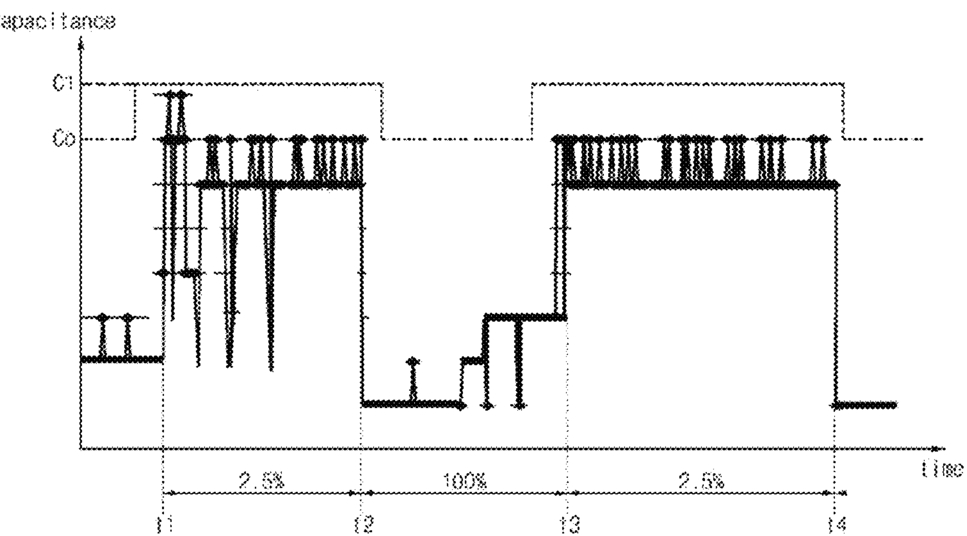

Referring to FIG. 16, when the touch reference value is changed in response to the brightness of the light source, although the brightness of the light source changes according to the duty ratio of the brightness control signal Slum, raw data TRD may be less than a capacitance set as the touch reference value. For example, when the duty ratio of the brightness control signal Slum is 2.5%, the touch reference value may be set to C1. In this case, even when the raw data TRD output from the touch driving circuit 1141 is greater than or equal to the predetermined capacitance C0, the image display device 1 may determine that there is no occurrence of touch.

As described above, according to various embodiments of the present disclosure, by setting a reference value associated with touch detection according to the brightness of a light source, it is possible to improve the accuracy of touch detection.

According to various embodiments of the present disclosure, as a reference value associated with touch detection for each of a plurality of screen areas is set according to the brightness of a plurality of light sources corresponding to the plurality of screen areas, it is possible to further improve the accuracy of touch detection.

The above description should not be construed as restrictive in all aspects but considered as illustrative. The scope of the disclosure should be determined by reasonable interpretation of the appended claims and all changes that come within the equivalent scope of the disclosure are included in the scope of the disclosure.

Meanwhile, the method for operating the image display device of the present disclosure can be implemented as processor-readable code in a recording medium readable by a processor provided in the image display device. The processor-readable recording medium may be any type of recording device capable of storing data readable by a processor. Examples of the processor-readable recording medium may include a ROM, a RAM, a CD-ROM, a magnetic tape, a floppy disc, and an optical data storage device. Also, the processor-readable recording medium may be implemented as a carrier wave (e.g., data transmission over the Internet). The processor-readable recording medium may be distributed to a computer system connected via a network so that the processor-readable codes may be saved and executed in a distributed manner.

Although the preferred embodiments of the present disclosure have been illustrated and described, those skilled in the art will appreciate that the present disclosure should not be limited to the above specific embodiments and various modifications thereof are possible without departing from the scope and spirit of the disclosure as disclosed in the accompanying claims, and these modifications should not be understood independently of the technical idea of the present disclosure.

The invention claimed is:

1. An image display device comprising:

a display including a plurality of touch electrodes; and a controller, wherein the display comprises:

a backlight module including at least one light source; and a touch module configured to detect a touch on the display based on a capacitance of the plurality of touch electrodes, wherein the controller is configured to output a control signal corresponding to a brightness of the light source, and wherein the touch module is configured to:

set a reference value for the capacitance based on the control signal; and detect the touch based on whether the capacitance is greater than or equal to the reference value.

2. The image display device of claim 1, wherein the control signal is a pulse width modulation (PWM) signal having a duty ratio corresponding to the brightness of the light source.

3. The image display device of claim 1, wherein the touch module is configured to:

based on the control signal corresponding to a first brightness level, set the reference value to a first capacitance; and based on the control signal corresponding to a second brightness level higher than the first brightness level, set the reference value to a second capacitance lower than the first capacitance.

4. The image display device of claim 1, wherein the touch module comprises:

a touch driving circuit configured to supply a touch driving signal to the plurality of touch electrodes and to generate raw data corresponding to the capacitance of the plurality of touch electrodes; and a touch coordinate calculator configured to determine a position at which the touch is detected based on the raw data received from the touch driving circuit and the reference value, and wherein the touch coordinate calculator sets the reference value based on the control signal.

5. The image display device of claim 1, further comprising an illuminance sensor configured to detect an ambient brightness of the image display device, wherein the controller is configured to:

based on the ambient brightness, determine a target luminance of the display; and based on the determined target luminance, determine the brightness of the light source.

6. The image display device of claim 1, wherein the backlight module comprises a plurality of light sources corresponding to a plurality of screen areas, wherein the plurality of touch electrodes correspond to the plurality of screen areas, and wherein, based on a brightness of each of the plurality of light sources, the touch module is configured to set the reference value for each of the plurality of touch electrodes corresponding to the plurality of screen areas.

7. The image display device of claim 6, wherein, based on a level of the brightness of a first light source corresponding to a first screen area being higher than a level of the brightness of a second light source corresponding to a second screen area, the touch module is configured to set a first reference value corresponding to the first screen area to be lower than a second reference value corresponding to the second screen area.

8. A method for operating an image display device, the method comprising:

determining, by a controller of the image display device, a brightness of a light source included in a backlight module of a display of the image display device;

setting, by a touch module of the image display device, a reference value for a capacitance of a plurality of touch electrodes included in the display based on the determined brightness of the light source; and detecting, by the touch module, a touch on the display based on whether the capacitance is greater than or equal to the reference value.

9. The method of claim 8, wherein a control signal corresponding to the brightness of the light source output by the controller is a pulse width modulation (PWM) signal having a duty ratio corresponding to the brightness of the light source.

10. The method of claim 8, wherein the setting of the reference value comprises:

based on the determined brightness of the light source corresponding to a first brightness level, setting the reference value to a first capacitance; and based on the determined brightness of the light source corresponding to a second brightness level higher than the first brightness level, setting the reference value to a second capacitance lower than the first capacitance.

11. The method of claim 8, wherein the touch module comprises:

a touch driving circuit configured to supply a touch driving signal to the plurality of touch electrodes and to generate raw data corresponding to the capacitance of the plurality of touch electrodes; and a touch coordinate calculator configured to determine a position at which the touch is detected based on the raw data received from the touch driving circuit and the reference value, and wherein the setting of the reference value comprises setting, by the touch coordinate calculator, the reference value based on the determined brightness of the light source.

12. The method of claim 8, wherein the determining of the brightness of the light source comprises:

determining a target luminance of the display based on an ambient brightness of the image display device detected by an illuminance sensor of the image display device; and determining the brightness of the light source based on the determined target luminance.

13. The method of claim 8, wherein the backlight module comprises a plurality of light sources corresponding to a plurality of screen areas, wherein the plurality of touch electrodes correspond to the plurality of screen areas, and wherein the setting of the reference value comprises setting, based on a brightness of each of the plurality of light sources, the reference value for each of the plurality of touch electrodes corresponding to the plurality of screen areas.

14. The method of claim 13, wherein the setting of the reference value comprises setting, based on the brightness of a first light source corresponding to a first screen area being higher than the brightness of a second light source corresponding to a second screen area, a first reference value corresponding to the first screen area to be lower than a second reference value corresponding to the second screen area.

* * * * *